United States Patent [19]

Bellefeuille et al.

[11] Patent Number: 4,524,608

[45] Date of Patent: Jun. 25, 1985

[54] GAS LEAK METER

[76] Inventors: David T. Bellefeuille, 19623 E. Batavia Dr., Aurora, Colo. 80011; Robert S. Beckwith, 2765 S. Colorado Blvd., Denver, Colo. 80222

[21] Appl. No.: 558,255

[22] Filed: Dec. 5, 1983

[51] Int. Cl.$^3$ .............................................. G01M 3/08
[52] U.S. Cl. ..................................... 73/40.5 R; 73/46
[58] Field of Search .......................... 73/40, 40.5 R, 46

[56] References Cited

U.S. PATENT DOCUMENTS

| | | | |
|---|---|---|---|
| 1,340,176 | 5/1920 | Meyer | 73/40.5 R |
| 3,245,256 | 4/1966 | Hayward | 73/40 |
| 3,511,082 | 5/1970 | Lathrop et al. | 73/46 |
| 3,583,435 | 6/1971 | Stewart | 73/46 |
| 3,872,714 | 3/1975 | Carlson | 73/46 |
| 4,020,697 | 5/1977 | Jander | 73/40.5 R |
| 4,068,522 | 1/1978 | Poe | 73/40.5 R |
| 4,453,399 | 6/1984 | Thompson | 73/40.5 R |

Primary Examiner—Ivars Cintins
Attorney, Agent, or Firm—Donald J. Singer; Stanton E. Collier

[57] ABSTRACT

A gas leak meter is directly attached to a valve box having a leaking valve therein. Based upon the rate of gas leakage, a decision can be made to delay or replace the leaking valve. The gas leak meter has a stopper that is placed into the valve box. The stopper has a rubber tube attached thereon and this tube leads to a gas collector which operates at atmospheric pressure. In a given period of time, the rate of gas leakage can be determined based upon the amount of gas collected.

10 Claims, 2 Drawing Figures

GAS LEAK METER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to gas testing devices that are associated with safety and preventive maintenance, and, in particular, is related to a gas leak meter for use in measuring the amount of gas leaking from an underground valve.

For safety reasons, gas pipelines are buried underground up to the point of actual use. Obviously, this involves the use of a great multitude of valves; these valves are normally reached through a valve box that is typically a cylindrical pipe that has an opening on the surface and reaches down to and surrounds the valve.

Because of this valve location and the inability to completely seal the top opening, the valve can be surrounded by water, ice, etc. which leads to rust and eventually leads to a leaking valve.

Past procedures usually involved some person noticing a gas smell in the area and calling a gas line maintenance crew through such agencies as the police and fire department. The gas line crew comes to the site with a leak detector that indicated whether there was a leak or not. If this was answered in the affirmative, the conventional procedure is to replace the valve if the leak was therein.

Although the procedure may sound wise, especially if safety of people and structure is of concern, it may not otherwise be prudent when safety is not the main issue.

For example, if a gas main valve is not in an area of great concern, as noted above, a certain amount of leaking gas may be acceptable. This would depend on the dollar amount of gas leaking in comparison to the replacement cost of the valve. If the cost to replace a valve is $5,000, material and labor, for example, and only $500 of gas is leaking per year, the above procedure involves a excessive investment compared to the problem.

Further, the above procedure does not allow for preventive maintenance other than replacement.

The installation of a typical gas flow meter in the system increases the resistance to gas flow and thus affects the readings. One would desire to have a device which operates at atmospheric pressure and is easily adaptable to a valve box without modification.

These drawbacks have motivated a search for a device that allows one to make a quantity and quality judgment about valve replacement.

SUMMARY OF THE INVENTION

The instant invention sets forth a gas leak meter that overcomes the problems noted above.

In order to determine the rate of gas leakage one installs a rubber stopper having a long flexible tube therein into the throat of a valve box. The free end of the tube is inserted into a gas collector wherein the leaking gas is collected. The gas collector has one chamber open to the atmosphere and a second chamber closed except where it connects to the first chamber at point lower than the opening. The free end of the tube is connected to allow gas to enter the second chamber and displace a fluid placed therein. As time passes, the leaking gas causes a change in the fluid height in the gas collector. Given the parameters known, the rate of gas leakage can be determined.

Once the rate of gas leakage is known, a cost analysis can be performed if the valve is not replaced due to excessive leakage.

Therefore, one object of the present invention is to provide for a gas leak meter that operates at atmospheric pressure.

Another object of the present invention is to provide for a gas leak meter that provides an accurate measurement of gas leakage without system interference.

Another object of the present invention is to provide for a method of cost analysis in determining valve replacement.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
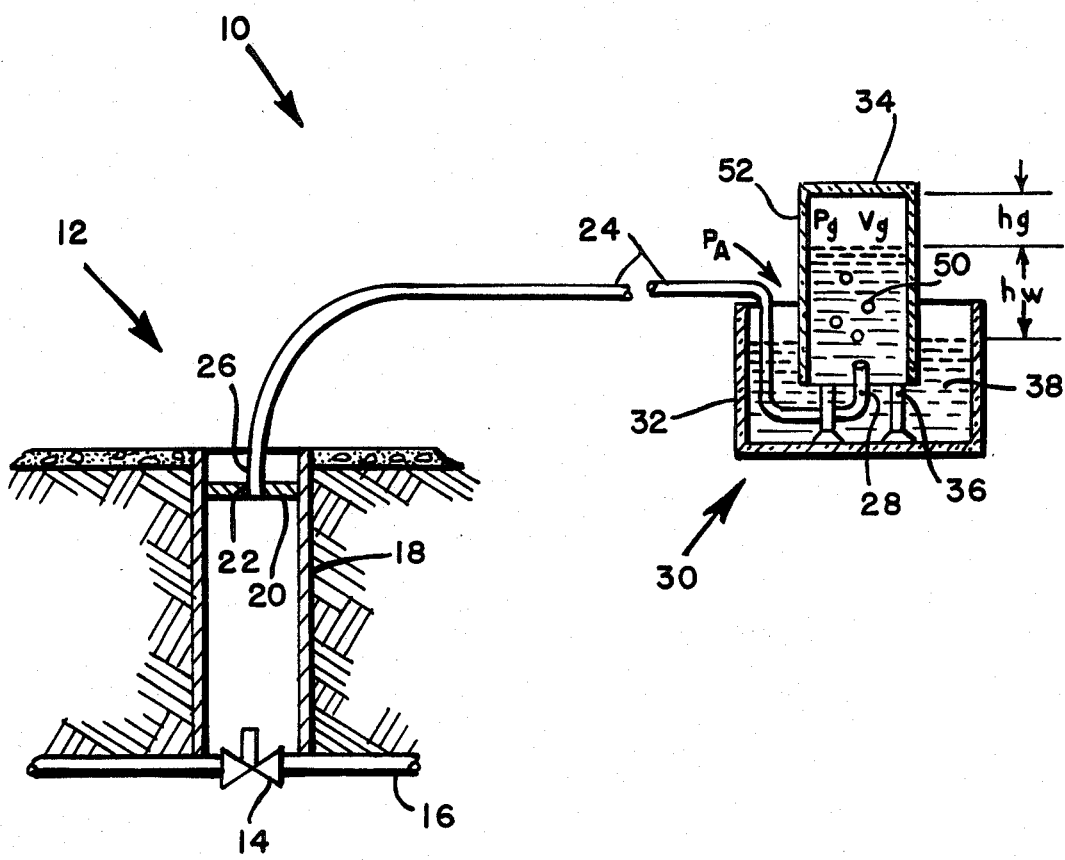
FIG. 1 is a representation of the gas leak meter of the present invention.

Referring to FIG. 1, a gas leak meter 10 is shown connected to a valve location 12. Valve location 12 is typically located in an area where if there is gas leakage there would be no danger to persons and/or property.

As part of a preventive maintenance program, a gas detector could be used to identify leaking valves such as an isolation valve 14 shown connected to a gas line 16 buried underground. Valve 14 is reached through a valve box 18 that is usually a cylindrical tube although other shapes would not effect the applicability of the present invention.

A rubber stopper 20 is firmly placed into valve box 18 so as to make a gas tight seal with valve box 18. Stopper 20 has a hole 22 therethrough into which is placed in a sealed manner a rubber tube 24. Tube 24 having a fixed end 26 and a free end 28 is used to conduct the leaking gas from valve box 18 with stopper 20 therein to a gas collector 30 near valve location 12.

Gas collector 30, shown in FIG. 1, is made of an outer container 32, preferably made of glass or a clear plastic, an inner container 34, preferably made also of glass or a clear plastic, and an inner container support 36. Inner container support 36 is used to lift inner container 34 off of outer container 32 so that open end 28 of tube 24 can be placed thereunder and into inner container 34. This would not be required if inner container 34 had means such as a nipple, not shown, attached to the lower end and also means to allow fluid 38 to move from container 34 to 32.

Figure 2:
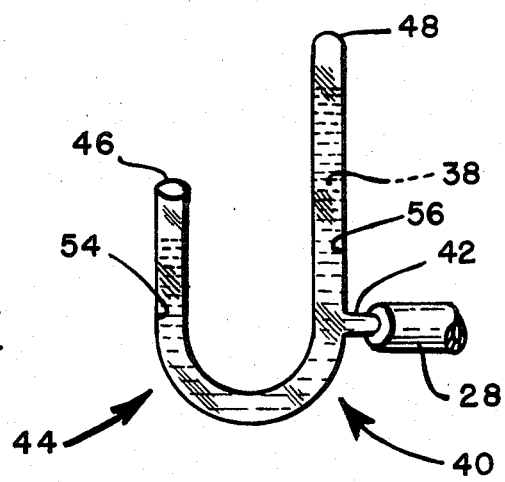
FIG. 2 is an alternative device for collecting the leaking gas.

An alternative shaped gas collector 40 is shown in FIG. 2 which performs in principle the same as collector 30 but would be more expensive because of special glass forming required.

An end 28 of tube 24 is attached to a nipple 42 which is a part of a U-shaped container 44 made of clear material, and further having an open end 46 and a closed end 48. A first chamber 54 and a second chamber 56 are formed therein and are connected at a lower end.

In operation, a timing device such as a stop watch, not shown, is started when gas bubbles 50 appear, FIG. 1, in fluid 38. After a sufficiently long period of time, $\Delta T$, gas bubbles 50 will collect in a top end 52 of inner container 34 and force fluid 38 out of container 34, which was full originally, into container 32. After this time, a height differential, $h_w$, will exist between the fluid 38 in container 32 and 34.

Referring to FIG. 1, the following nomenclature is used to determine the rate of gas leakage:

$P_A$=atmospheric pressure
$P_g$=final pressure of measured gas
$P_B$=pressure at which gas is billed
$V_g$=final volume of measured gas
$V_B$=volume of gas at the pressure that the public service bills
R=radius of container 34
$h_w$=fluid differential height
$h_g$=height of volume $V_g$
$\Delta T$=period gas allowed to collect
$\rho$=density of fluid
g=accel. due to gravity Using the above, the gas equilibrium equation, $P_A = \rho g h_w + P_g$, and the ideal gas law, $P_g V_g = P_B V_B$, the rate of gas leakage is given by the following equation:

$$\text{Rate of Gas Leakage} = \frac{V_B}{\Delta T} = \left[ \pi \cdot \frac{R^2 h_g}{P_B} \right] \cdot [P_A - \rho g h_w] \cdot \frac{1}{\Delta T}$$

Using the following example numbers:
R=2.88 in.
$h_g$=6 in.
$P_A$=14.49 lbs/in.$^2$
$h_w$=2 in.
$P_B$=12.390 lbs/in.$^2$
$\Delta T$=2 min.

one arrives at a rate of gas leakage of about 27,500 cubic feet per year.

The cost of gas leakage can thus be compared to the cost of replacing leaking valve 14, and thus a decision as whether to replace immediately, or delay replacement of valve 14 can be determined.

The above procedure and gas leak meter 10 provide a means of cost analysis not provided by a gas detector or a conventional flow meter. Meter 10 is relatively inexpensive, simple to operate and easy to install.

Clearly, many modifications and variations of the present invention are possible in light of the above teachings and it is therefore understood, that within the inventive scope of the inventive concept, the invention may be practiced otherwise than specifically claimed.

What is claimed is:

1. A gas leak meter, said gas leak meter removably attached to a valve box containing a leaking gas valve therein, said gas leak meter comprising:

means for blocking the escape of leaking gas from said valve box, said means for blocking removably attached to said valve box, said means for blocking having therein a hole for channeling said leaking gas, a flexible tube, said tube fixedly attached to said hole in said means for blocking, means for collecting said leaking gas at atmospheric pressure, said means for collecting having a first chamber with an open end exposed to said atmospheric pressure, said means for collecting having a second chamber having a closed top end, said first and said second chambers communicating through operably connected lower ends, said tube operably connected to allow said leaking gas to collect in said second chamber, said second chamber completely filled with a fluid before said leaking gas enters therein, and means for timing, said timing means providing a period of time during which said leaking gas partially fills said second chamber.

2. A gas leak meter as defined in claim 1 wherein said means for blocking comprises a slab of rubber which when inserted into said valve box prevents the escape of said leaking gas between said slab and said valve box.

3. A gas leak meter as defined in claim 2 wherein said slab is cylindrically shaped.

4. A gas leak meter as defined in claim 1 wherein said means for collecting includes a means for supporting said second chamber.

5. A gas leak meter as defined in claim 4 wherein said first chamber is a cylindrical container having said open top and a closed bottom.

6. A gas leak meter as defined in claim 5 wherein said container is made of clear material.

7. A gas leak meter as defined in claim 6 wherein said second chamber is a cylindrical container having said closed top and an open lower end.

8. A gas leak meter as defined in claim 7 wherein said second chamber is made of a clear material, and further said second container has a diameter less than a diameter of said first container and is seated therein.

9. A gas leak meter as defined in claim 1 wherein said means for collecting comprises a "U" shaped container, one top end of said container being open, the other top end of said container being closed, and a nipple attached to said container to allow said leaking gas flowing through said tube to enter into only said closed top end.

10. A method of measuring the rate of gas leaking from a leaking valve buried underground and reached through a valve box, said method comprising said steps of:

attaching a stopper to said valve box, said stopper having a tube therein such that leaking gas flows therein, filling a means for collecting gas at atmospheric pressure with a fluid, said fluid totally filling a second chamber, said second chamber having a closed top end and an open bottom end, some of said fluid partially filling a first chamber, said first chamber having an open end exposed to atmospheric pressure, allowing said leaking gas flowing through said tube to enter into said second chamber, allowing said leaking gas to enter said second chamber for a given period of time, measuring a differential fluid height between said first and said second chamber, calculating the rate of gas leakage, and comparing a cost of gas leaking to a cost of replacing said leaking valve.

* * * * *